United States Patent
Allen et al.

(10) Patent No.: US 10,723,554 B2
(45) Date of Patent: Jul. 28, 2020

(54) SYSTEMS AND METHODS FOR INTAKE AND TRANSPORT OF PHYSICAL OBJECTS IN A FACILITY

(71) Applicant: Walmart Apollo, LLC, Bentonville, AR (US)

(72) Inventors: William Ross Allen, Pea Ridge, AR (US); Richard Montgomery Blair, II, Bentonville, AR (US); Thomas L. Harper, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/940,331

(22) Filed: Mar. 29, 2018

(65) Prior Publication Data

US 2018/0282075 A1 Oct. 4, 2018

Related U.S. Application Data

(60) Provisional application No. 62/480,796, filed on Apr. 3, 2017.

(51) Int. Cl.
*B65G 1/04* (2006.01)
*G06Q 10/08* (2012.01)
(Continued)

(52) U.S. Cl.
CPC .......... *B65G 1/0492* (2013.01); *B65G 43/00* (2013.01); *B66F 9/063* (2013.01); *G01C 21/206* (2013.01);
(Continued)

(58) Field of Classification Search
CPC .................. B65G 1/0492; G05B 19/41895
See application file for complete search history.

(56) References Cited

U.S. PATENT DOCUMENTS

| | | | |
|---|---|---|---|
| 6,429,016 B1 * | 8/2002 | McNeil | G01N 35/0099 414/222.02 |
| 6,435,407 B1 | 8/2002 | Fiordelisi et al. | |

(Continued)

FOREIGN PATENT DOCUMENTS

| | | |
|---|---|---|
| CA | 2506854 C | 1/2015 |
| WO | 2001067344 A1 | 9/2001 |

OTHER PUBLICATIONS

International Search Report and Written Opinion from related International Patent Application No. PCT/US2018/025124 dated Jun. 20, 2018.

*Primary Examiner* — Thomas Randazzo
(74) *Attorney, Agent, or Firm* — McCarter & English, LLP; David R. Burns

(57) ABSTRACT

Described in detail herein are methods and systems for an intake and transport system. A computing system can identify a physical object based on an attribute associated with the physical object. The computing system can determine a storage location of the physical object in the facility based on the attribute. In response identification of the physical object computing system can transmit an identifier to an autonomously controlled cart. The identifier corresponds to at least one of the attribute or the storage location. In response to receipt of the identifier activating an autonomously controlled cart can generate an indicator to indicate that the physical object is to be placed in the autonomously controlled cart. The autonomously controlled cart can autonomously navigate to the storage location in response to determining that the threshold capacity has been satisfied.

20 Claims, 6 Drawing Sheets

(51) Int. Cl.

| | | |
|---|---|---|
| *B65G 43/00* | (2006.01) | |
| *G05D 1/00* | (2006.01) | |
| *G08B 5/22* | (2006.01) | |
| *G05B 15/02* | (2006.01) | |
| *G01C 21/20* | (2006.01) | |
| *B66F 9/06* | (2006.01) | |
| *G05D 1/02* | (2020.01) | |
| *G05B 19/418* | (2006.01) | |

(52) U.S. Cl.
CPC ....... *G05B 15/02* (2013.01); *G05B 19/41895* (2013.01); *G05D 1/0027* (2013.01); *G05D 1/0088* (2013.01); *G05D 1/0246* (2013.01); *G05D 1/0297* (2013.01); *G06Q 10/08* (2013.01); *G08B 5/22* (2013.01); *G05B 2219/31002* (2013.01); *G05D 2201/0216* (2013.01)

(56) References Cited

U.S. PATENT DOCUMENTS

| | | | |
|---|---|---|---|
| 7,376,572 B2 | 5/2008 | Siegel | |
| 9,053,451 B2 | 6/2015 | Gventer et al. | |
| 9,089,969 B1* | 7/2015 | Theobald | B25J 9/1687 |
| 9,334,116 B2 | 5/2016 | DeWitt et al. | |
| 9,487,356 B1 | 11/2016 | Aggarwal | |
| 9,827,683 B1* | 11/2017 | Hance | G06K 19/06037 |
| 9,908,702 B2* | 3/2018 | Elazary | B65G 1/1375 |
| 9,919,872 B2* | 3/2018 | Khodl | B25J 5/007 |
| 10,233,021 B1* | 3/2019 | Brady | G06Q 50/30 |
| 10,303,171 B1* | 5/2019 | Brady | G08G 1/207 |
| 2010/0316470 A1* | 12/2010 | Lert | B65G 1/045 |
| | | | 414/273 |
| 2014/0288696 A1* | 9/2014 | Lert | B65G 1/0492 |
| | | | 700/216 |
| 2014/0343713 A1* | 11/2014 | Ziegler | G06Q 10/08 |
| | | | 700/214 |
| 2015/0006005 A1* | 1/2015 | Yu | G06Q 50/28 |
| | | | 701/22 |
| 2015/0032252 A1* | 1/2015 | Galluzzo | B25J 5/007 |
| | | | 700/218 |
| 2015/0310387 A1 | 10/2015 | Friedman et al. | |
| 2015/0375398 A1* | 12/2015 | Penn | G06Q 10/083 |
| | | | 700/218 |
| 2016/0107838 A1* | 4/2016 | Swinkels | B65G 1/1373 |
| | | | 414/273 |
| 2016/0257212 A1 | 9/2016 | Thompson et al. | |
| 2016/0379154 A1* | 12/2016 | Rodoni | G06Q 10/063114 |
| | | | 705/7.15 |
| 2018/0029797 A1* | 2/2018 | Hance | B65G 1/1373 |
| 2018/0032949 A1* | 2/2018 | Galluzzo | B25J 5/007 |
| 2018/0088586 A1* | 3/2018 | Hance | G06Q 10/0832 |
| 2018/0096299 A1* | 4/2018 | Jarvis | G06Q 10/0875 |
| 2018/0127211 A1* | 5/2018 | Jarvis | G06Q 10/087 |
| 2018/0137454 A1* | 5/2018 | Kulkarni | B64C 39/024 |
| 2018/0158016 A1* | 6/2018 | Pandya | G06Q 10/087 |
| 2019/0179329 A1* | 6/2019 | Keivan | G05D 1/0214 |

\* cited by examiner

SYSTEMS AND METHODS FOR INTAKE AND TRANSPORT OF PHYSICAL OBJECTS IN A FACILITY

CROSS-REFERENCE TO RELATED PATENT APPLICATIONS

This application claims priority to U.S. Provisional Application No. 62/480,796 filed on Apr. 3, 2017, the content of which is hereby incorporated by reference in its entirety.

BACKGROUND

Returning physical objects to various locations in a large facility can be a slow and error prone process. Physical objects can be misplaced and lost.

BRIEF DESCRIPTION OF DRAWINGS

Illustrative embodiments are shown by way of example in the accompanying drawings and should not be considered as a limitation of the present disclosure.

DETAILED DESCRIPTION

Figure 1:
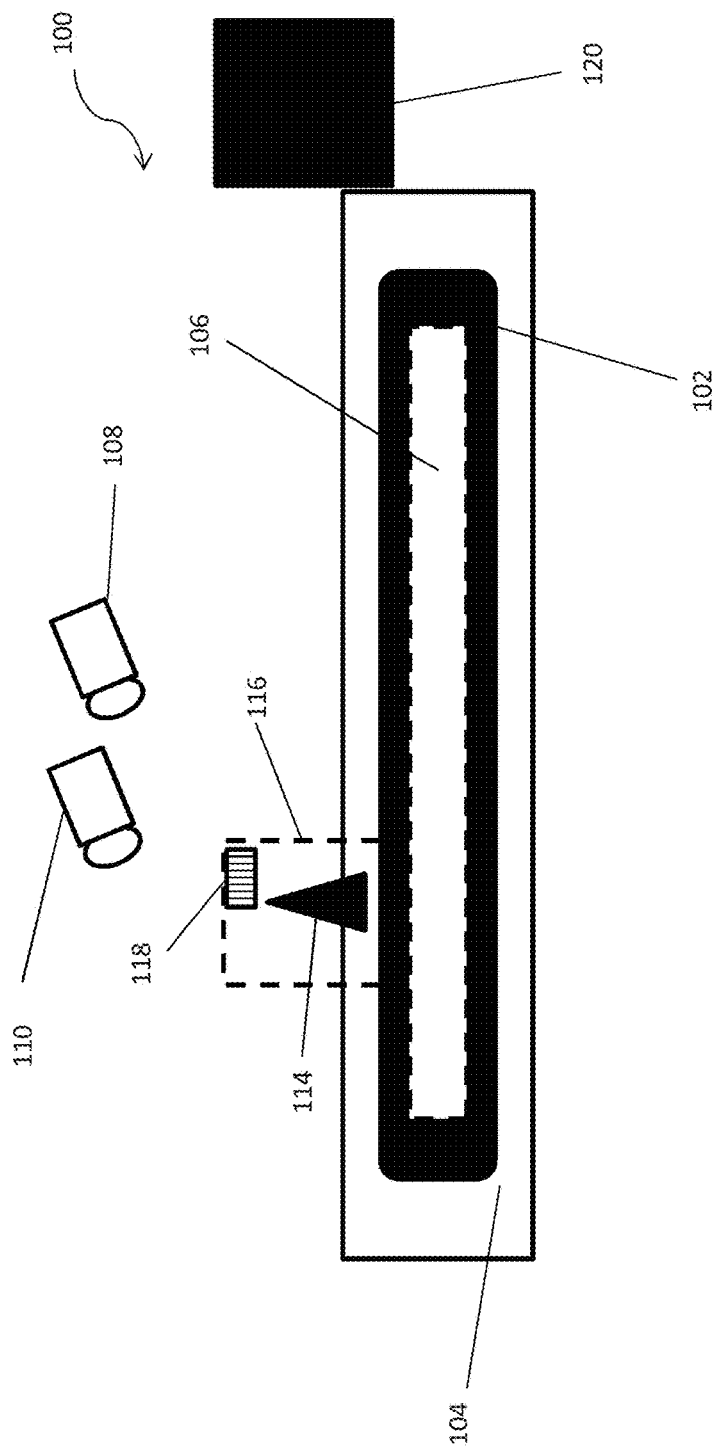
FIG. 1 is a schematic illustration of an exemplary physical object intake and deposit area in accordance with an exemplary embodiment.

Described in detail herein are methods and systems for an intake and transport system. A computing system can identify a physical object based on an attribute associated with the physical object. The computing system can be disposed in a deposit area in a facility. The computing system can determine a storage location of the physical object in the facility based on the attribute. In response identification of the physical object computing system can transmit an identifier to an autonomously controlled cart. Embodiments of the autonomously controlled cart can include an inertial navigation system configured to detect and avoid obstacles as the autonomously controlled cart navigates to the storage location. Autonomously controlled carts can be disposed in the deposit area and can be in communication with the computing system. The identifier can correspond to at least one of the attribute or the storage location. In response to receipt of the identifier an autonomously controlled cart can be activated to generate an indicator to indicate that the physical object is to be placed in the autonomously controlled cart. The autonomously controlled cart can determine whether a threshold capacity of the autonomously controlled cart is satisfied as physical objects are added to the cart. The autonomously controlled cart can autonomously navigate to the storage location in response to determining that the threshold capacity has been satisfied.

The computing system can be programmed to identify an additional physical object based on an attribute associated with the additional physical object, determine another storage location for the additional physical object in the facility based on the attribute transmit an additional identifier to the autonomously controlled carts, the additional identifier corresponding to at least one of the attribute of the additional physical object or the other storage location. In response to receipt of the identifier a different autonomously controlled cart is configured to activate an indicator on the different autonomously controlled cart to indicate to the user of the computing system that the additional physical object is to be placed in the different autonomously controlled cart, determine whether a threshold capacity of the different autonomously controlled cart is satisfied, and autonomously navigate to the other storage location in response to determining that the threshold capacity has been satisfied.

The system further includes a database. The autonomously controlled cart is configured to interact with the database based on the attribute of the physical object. Embodiments of the autonomously controlled cart can include an electronic scale and can be configured to measure, via the electronic scale, a weight of the physical object(s) received by the autonomously controlled cart, query the database based on the attribute to retrieve a stored weight of the first physical object and compare the weight of the physical object measured by the electronic scale with the stored weight of the physical object to verify the physical object placed in the cart corresponds to the attribute. The autonomously controlled cart can be configured to remain at the storage location until the physical object is removed from the autonomously controlled cart. In response to the autonomously controlled cart being emptied, the autonomously controlled cart can navigate back to the deposit area. In response to reaching the storage location, the autonomously controlled cart can be configured to transmit a message to a mobile device to activate an alert on the mobile device notifying a user of the mobile device that the autonomously controlled cart has arrived at the storage location.

FIG. 1 is a block diagram of an exemplary intake system 100 in a physical object intake and deposit area in accordance with an exemplary embodiment. In exemplary embodiments, the system 100 in the intake and deposit area can include a conveyer belt 102 disposed in one or more belt cabinets 104, a scale 106, image capturing device(s) 108, and one or more readers 110. The scale 106, the image capturing device(s) 108, and the reader(s) 110 can be in communication with a computing system 120, that can receive data from the scale 106, image capturing device 108, and reader(s) 110 to facilitate the intake and deposit processes described herein.

The conveyer belt 102 can receive packaged (or unpackaged) physical objects 114. The packaging 116 of the physical objects 114 of the physical object itself can include a machine-readable element 118. The machine-readable element 118 can be encoded with an identifier associated with the physical object 114. The machine-readable element 116 can be a barcode, QR code, an/or an RFID tag. The reader 110 can be configured to read and decode the identifier from the machine-readable element 118. The reader 110 can transmit the identifier to the computing system 120. The image capturing device 108 can capture one or more images of the physical objects 114. The image capturing device 108 can transmit the captured images to the computing system 120. The scale 102 can detect the weight of the physical objects and can transmit the weight to the computing system 120.

The conveyer belt 102 can be formed by one or more belts operatively coupled to one or more belt cabinets 104, which may include rollers (e.g., friction and drive rollers) and a drive motor. The driver motor can control one or more of the rollers to rotate the belt to provide a transport for moving items along a length of the conveyor belt 102 from one end of the conveyor belt 102 to an opposite end of the conveyor belt 102. The image capturing device 108, the scale 104, and the reader 110 can be disposed at stations positioned at different locations along the length of the conveyor belt 102. The conveyor belt 102 can transport the physical objects 114 from station to station so autonomous intake and deposit processes can be implemented at the stations. For example, the conveyor belt 102 can transport the physical objects 114 to a first station, which can include the reader(s) 110 to read the machine-readable elements 118; a second station, which can include a scale 104 to weigh the physical objects 114; and a third station, which can include the image capturing device(s) 106 to capture one or more images of the physical object.

The reader(s) 110 can read the machine-readable element 118 affixed to the packaging 116 of the physical object itself and can decode the machine-readable element 118 to extract the identifier. The reader(s) 110 can be disposed above or to a side of the conveyor belt 102 and/or can automatically move or be repositioned with respect to the conveyor belt 102 (e.g., can be operatively coupled to a track and can be moved along the track). In some embodiments, the system 100 can include a single reader 110 or multiple readers 110 at different positions and/or orientations to facilitate scanning of machine-readable elements located in different positions on packaging 116. It can be appreciated the machine-readable element 118 is disposed on the physical object 114. In some embodiments, one or more mirrors can be disposed about the conveyor belt 102 at the station that includes the reader(s) 110. For embodiments in which the reader(s) are implemented as optical readers, the mirrors can be positioned to reflect light (e.g., infrared light) output by the reader(s) and/or reflected from one or more surfaces (e.g., a surface of the package) to read machine-readable elements disposed in different positions on packages. The reader(s) 110 can be configured to extract encoded information from machine-readable element 118 and decode the encoded information such as the identifier associated with the physical object 118. As mentioned above, the identifier can be transmitted to the computing system 120. If no machine-readable identifier is found on the packaging, an indication that the reader(s) 110 failed to read a machine-readable identifier can be transmitted to the computing systems 120.

The physical object 114 can be transported to the station that includes the scale 106. The scale 106 can be embedded in or under the conveyer belt 102 to weigh the physical object 114. The scale 106 can be an electronic weighing machine configured to determine a weight of the physical object 114 on the conveyor belt. The scale 106 can be an analog or digital scale that calculates the weight of objects using one or more strain gauges, piezoelectric devices, pressure sensors, or other suitable devices that can convert a force applied to the scale by an object (e.g., from gravity) to an electrical signal representative of the force. As described above, the output of the scale can be transmitted to the computing system 120.

The physical object 114 can be transported from the station including the scale 106 to the station that includes the image capturing device(s) 108 by the conveyor belt 102. The image capturing device(s) 108 can be disposed with respect to the conveyor belt 102 to capture one or more images of the physical object 114. The image capturing device(s) 108 can be disposed above or to the side of the conveyer belt 102. In some embodiments, the system can include a single image capturing device 106 or multiple image capturing devices 108 at different positions and/or orientations to facilitate capturing images of the physical object at different orientations and positions. In some embodiments, the image capturing device 108 can be configured to move to capturing images of the physical object from different orientation and/or positions. The image capturing device 108 can be a camera and can capture still images or moving images of the physical object 114. The image(s) captured by the image capturing device(s) 108 can be transmitted to the computing system 120.

The computing system 120 can receive the identifier from the reader 110, the weight detected by the scale 106, and the images captured by the image capturing device 108. The computing system 120 can determine attributes associated with the physical object 114 based on the identifier, the weight and the images. Details of the computing system 120 will be further discussed with respect to FIG. 4.

Figure 2:
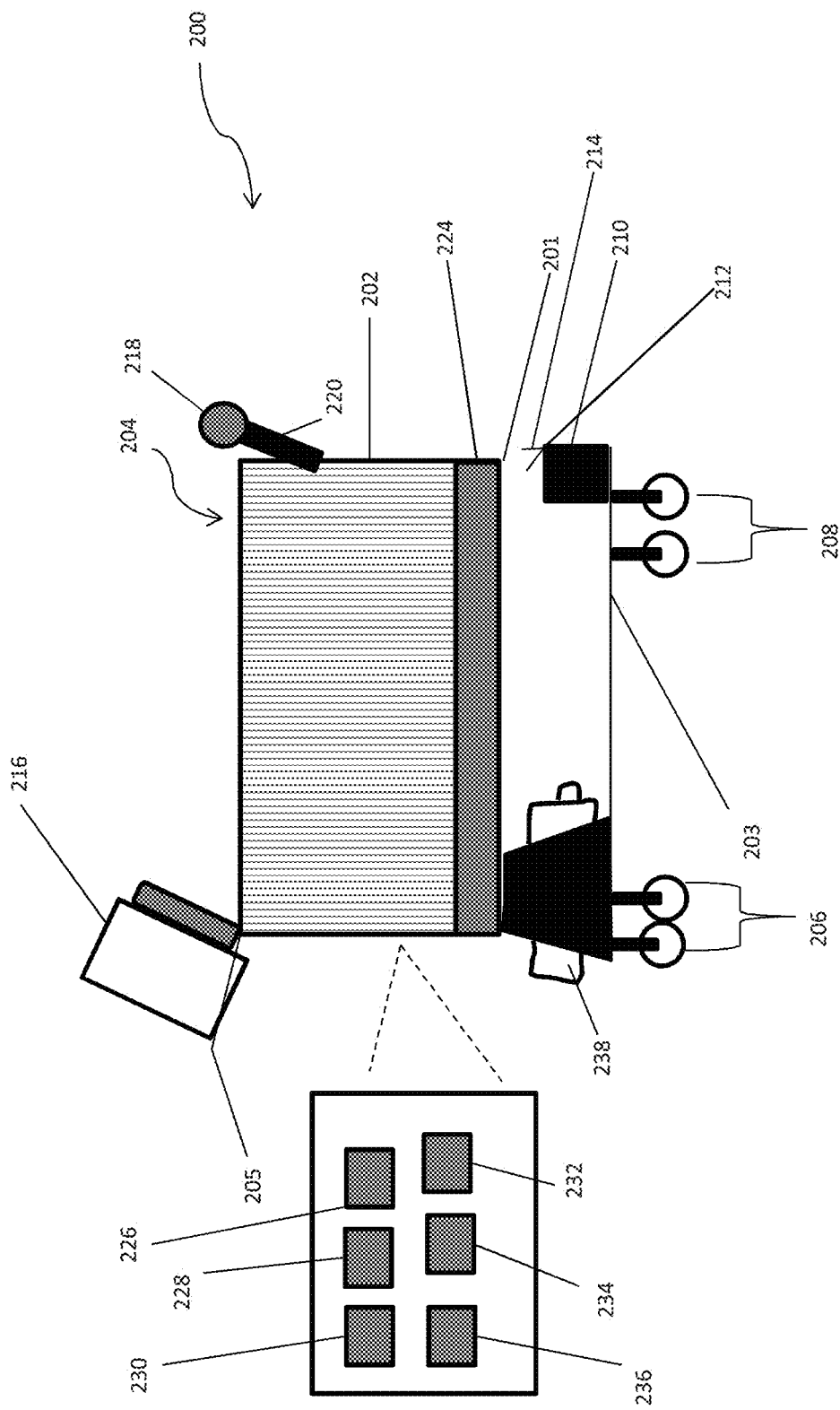
FIG. 2 illustrates an exemplary autonomously controlled cart in accordance with an exemplary embodiment.

FIG. 2 illustrates an exemplary autonomously controlled cart in accordance with an exemplary embodiment. The autonomously controlled cart 200 can include a frame 201, a basket 202 supported by the frame 201, two front wheels 206 and two rear wheels 208. The cart can further include a handle 205 connected to the frame 201. The handle 205 can be used to manually operate the cart 200. The autonomously controlled cart 200 can further include a controller 210, wireless transmitter 212, wireless receiver 214, an image capturing device 216, a light source 218, a light sensor 220, a scale 224, a drive motor 226, a GPS receiver 228, accelerometer 230 and a gyroscope 232, and can be configured to roam autonomously through the facility. The controller 210 can be programmed to control an operation of the image capturing device 216, the light source 218, the light sensor 220, the scale, the drive motor 226, the wheels 206-208 (e.g., via the drive motor 226), in response to various inputs including inputs from the wireless receiver 214, the GPS receiver 228, the accelerometer 230, and the gyroscope 232. The drive motor 132 can control the operation of the wheels 206-208 directly and/or through one or more drive trains (e.g., gear assemblies and/or belts).

The GPS receiver 228 can be a L-band radio processor capable of solving the navigation equations in order to determine a position of the autonomously controlled cart 200, determine a velocity and precise time (PVT) by processing the signal broadcasted by GPS satellites. The accelerometer 230 and gyroscope 232 can be used to determine the direction, orientation, position, acceleration, velocity, tilt, pitch, yaw, and roll of the autonomously controlled cart 200. In exemplary embodiments, the controller 210 can implement one or more algorithms, such as a Kalman filter and/or SLAM algorithm, for determining a position of the autonomously controlled cart 200. The controller 210 can receive instructions from the computing system 120 to navigate to a particular location in the facility.

The image capturing device 216 and the light sensor 220 can be used to assist in avoiding obstacles, objects and/or people in the facility as the autonomously controlled cart 200 is navigating throughout the facility. For example, the image capturing device 216 and the light sensor 220 can scan for any obstacles, objects and/or people while navigating in the facility. In response to detecting any obstacles, objects and/or people the autonomously controlled cart 200 can reroute itself to avoid the detected obstacles, objects and/or people.

The scale 224 can be disposed at the base of the volume 204 of the basket 202. The scale 224 can be configured to detect a weight of one or more physical objects disposed inside the basket 202. The scale 224 can communicate with the computing system 120 through the wireless transceiver and receiver 212, 214. The light source 218 can generate various light effects. The light source can communicate with the computing system 200 through the wireless transceiver and receiver 212, 214.

The autonomously controlled cart 200 can include a power source such as a battery 238 disposed on a base 203 of the autonomously controlled cart 200. The battery 238 can provide power to the controller 210, the wireless transceiver 212, the wireless receiver 214, the image capturing device 216, the light source 218, the light sensor 220, the scale 224 and the drive motor 226.

Figure 3:
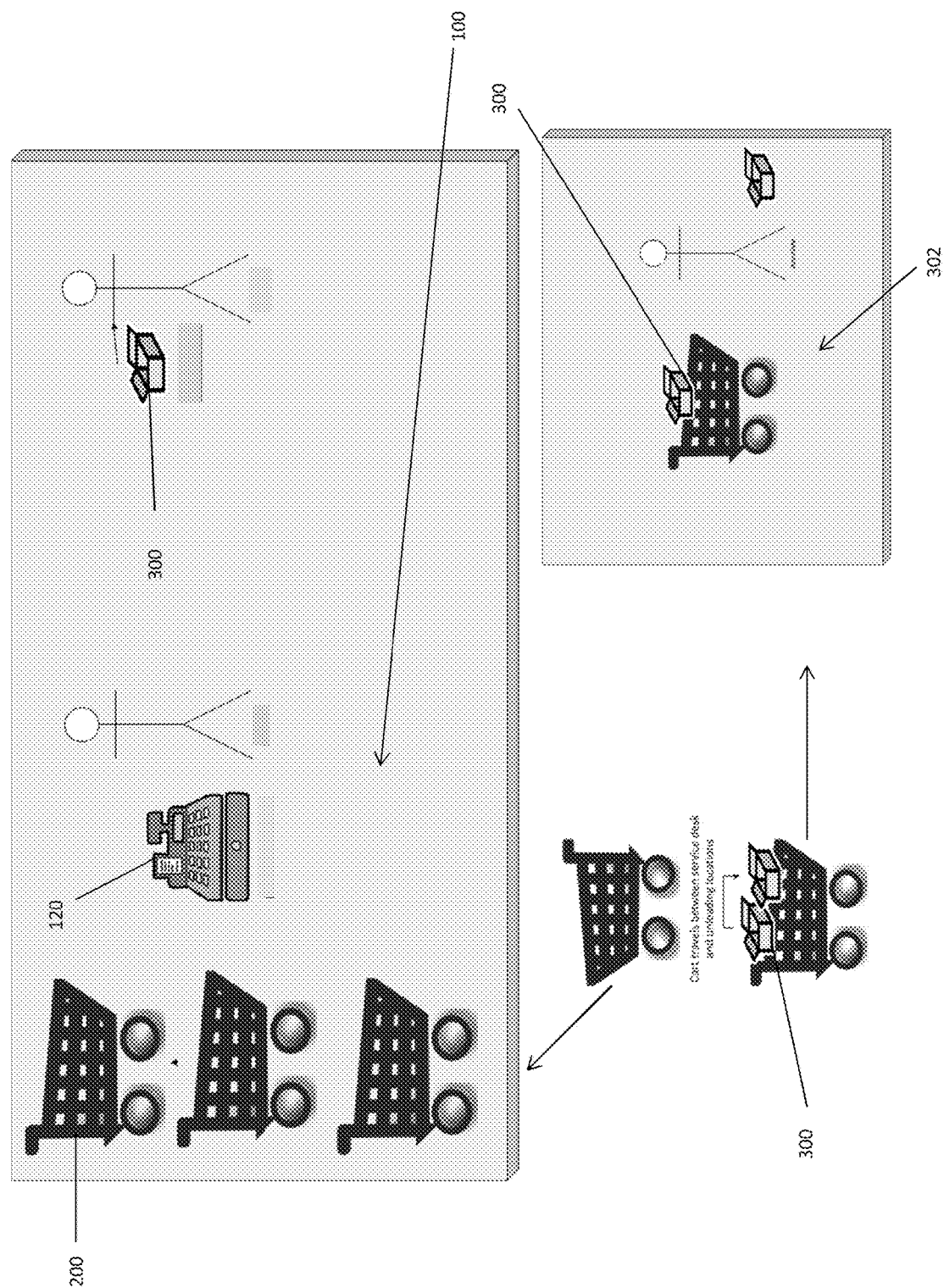
FIG. 3 illustrates an exemplary transport system in accordance with an exemplary embodiment.

FIG. 3 illustrates an exemplary transport system in accordance with an exemplary embodiment. Autonomously controlled carts 200 and a computing system 120 can be disposed in the intake and deposit area in the facility. The system 100 in the intake and deposit area can receive a physical object 300. The computing system 120 can determine attributes associated with the physical object 300 and select an autonomously controlled cart 200 for transporting the physical object to a location 302 within the facility, as described herein. In some embodiments, the autonomously controlled carts 200 can include an indicator (e.g. a light source 218 as shown in FIG. 2). The computing system 120 can transmit a signal to the autonomously controlled carts 200 to control the indicator to indicate the physical object 300 should be deposited in the autonomously controlled carts 200. The physical object 300 can be deposited in the basket of the selected autonomously controlled cart 300 and selected autonomously controlled cart 200 can carry physical object 300 and autonomously navigate to the location 302. The physical object 300 can be unloaded from the basket of the autonomously controlled cart 200 at the location 302.

Figure 4:
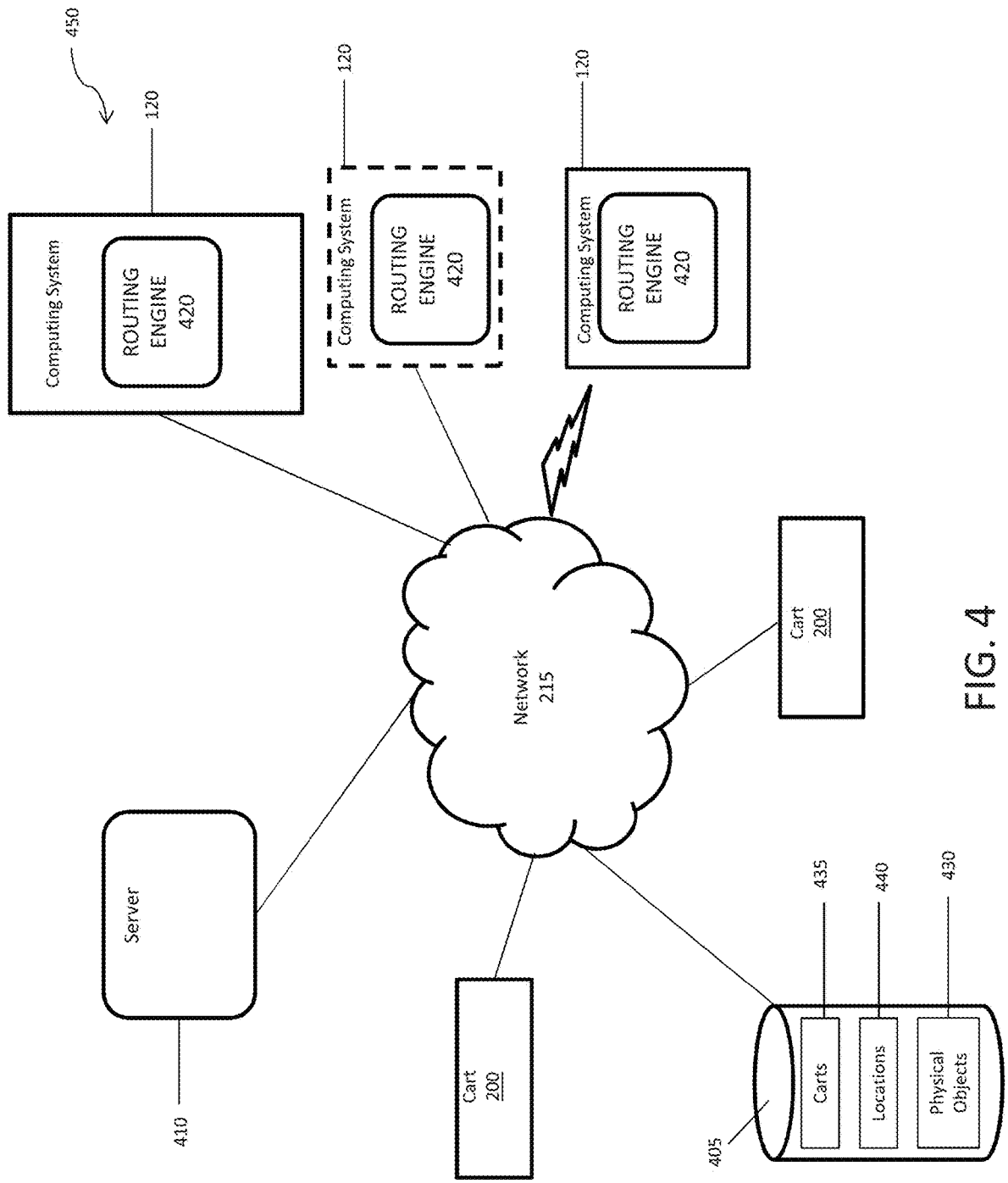
FIG. 4 illustrates an exemplary network diagram of a intake and transport system in accordance with an exemplary embodiment.

FIG. 4 illustrates an exemplary network diagram of an embodiment of an intake and transport system in accordance with an exemplary embodiment. The intake and transport system 450 can include one or more computing systems 120, one or more servers 410, one or more databases 405 and one or more autonomously controlled carts 200. In exemplary embodiments, the computing systems 120 are in communication with the one or more servers 410, one or more databases 405 and one or more autonomously controlled carts 200 via a communications network 415. The computing system 120 can execute one or more instances of a routing engine 420. The routing engine 420 can be an executable application residing on the computing system 120. The routing engine 420 can implement the process of the intake and transport system as described herein.

In an example embodiment, one or more portions of communications network 415 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The one or more servers 410 includes one or more computers or processors configured to communicate with the one or more computing systems 120, one or more databases 405 and one or more autonomously controlled carts 200, via the network 215. The server(s) 410 can host one or more applications configured to interact with the one or more computing systems 120 and/or can facilitate access to contents of the one or more databases 405. The server(s) 410 can host webpages generated by the one or more computing systems 120 in accordance with embodiments described herein. The databases 405 may store information/data, as described herein. For example, the databases 405 can include a physical object information database 430, a carts database 435 and a locations database 440. The physical objects information database 430 can store information associate with physical objects disposed in a facility. The carts database 435 can include information associated with the autonomously controlled carts 200. The locations database can include coordinates of locations within the facility based on one or more coordinate systems, such as, for example, longitude and latitude. The databases 405 and server 410 can be located at one or more geographically distributed locations from each other or from the computing system 120. Alternatively, the databases 405 can be included within server 410.

In one embodiment, a computing system 120 and autonomously controlled carts 200 can be disposed in a intake and deposit area of the facility. The computing system 120 can be coupled to an image capturing device, reader, and scale as described above with reference to the system 100 shown in FIG. 1. The computing system 120 can receive images of a physical object captured by the image capturing device, an identifier associated with the physical object, and a weight of the physical object. The computing system 120 can execute the routing engine 420 in response to receiving the images, identifier and weight of the physical object. The routing engine 420 can extract a set of attributes associated with the physical object from the images. The routing engine 420 can use machine vision and/or video analytics to extract the set of attributes. The set of attributes can include color, size, dimensions, amount of use of the physical object and/or shape of the physical object. The routing engine 420 can query the physical objects information database 430 using the identifier to retrieve information associated with the physical object. The information can be type of physical object, name of physical object, size, dimensions, weight and shape. The routing engine 420 can confirm the identity of the physical object by comparing the retrieved weight of the physical object and the received weight from the scale. The routing engine 420 can determine a location within the facility to store the physical object based on the extracted set of attributes, the retrieved information and the received weight.

The routing engine 420 can query the carts database 435 to determine which autonomously controlled cart 200 is scheduled to navigate to the determined location. Furthermore, the routing engine 420 can retrieve information about the autonomously controlled cart 200. The information can include size of the shopping cart and/or physical objects already disposed in the shopping cart. The routing engine 420 can determine whether the physical object can fit in the autonomously controlled cart 200 based on the retrieved information. The routing engine 420 can transmit instructions to the autonomously controlled cart 200 to transport the physical object to the determined location in the facility. The determined location can be a storage area. The instructions can include information associated with the physical object, the detected weigh to the physical object and an identifier associated with the determined location. The information associated with the physical object an include an identifier, name, size, dimensions and/or shape of the physical object. The autonomously controlled cart 200 can receive the instructions. The autonomously controlled cart 200 can determine weight and amount of physical objects already disposed in the basket of the autonomously controlled cart. As mentioned above, a scale can be disposed in the basket of the autonomously controlled cart 200. The scale can detect the weight of the physical objects disposed in the basket. The autonomously controlled cart 200 can determine whether the basket can receive the physical object included in the instructions. In response to determining the basket can receive the physical object included in the instructions, the autonomously controlled cart 200 can generate a light effect using a light source. The physical object can be deposited in the basket of the shopping cart. Alternatively, in response to determining the basket cannot receive the physical object, the autonomously controlled cart 200 can generate a different light effect using the light source.

The autonomously controlled cart 200 can detect the physical object has been deposited in the basket of the shopping cart in response to detecting the additional weight in the basket, via the scale. The autonomously controlled cart 200 can compare the additional weight to the weight of the physical object included in the instructions to confirm the autonomously controlled cart 200 received the same physical object as the physical object included in the instructions. The autonomously controlled cart 200 can also query the physical objects database using the identifier to retrieve an stored weight of the physical object. In response to confirming the physical object received by the autonomously controlled cart 200 is the same physical object included in the instructions, the autonomously controlled cart 200 can determine whether the autonomously controlled cart 200 can receive further physical objects. In response to determining the autonomously controlled cart 200 cannot receive further physical objects, the autonomously controlled cart 200 can query the locations database 440 to retrieve the coordinates of the determined location in the facility. The autonomously controlled cart 200 can navigate through the facility to the location included in the instructions. Once reaching the location the physical object can be unloaded from the basket of the autonomously controlled cart 200.

In some embodiments, the computing system 120 can transmit a message indicating the determined location to all of the autonomously controlled carts 200 disposed in the intake and deposit area. Based on the location and threshold capacity of the autonomously controlled carts, one or more of the autonomously controlled carts 200 can generate an indicator via the light source to indicate availability to transport the physical object to the determined location.

As a non-limiting example, the intake and transport system 450 can be embodied in a retail store. The computing system 120 can be a Point-of Sale (POS) terminal disposed in a return area of the retail store. The autonomously controlled carts 200 can be disposed in return area of the retail store. The computing system 120 can be coupled to an image capturing device, reader, and scale as described above. The return area can receive a product indented for return on a conveyer belt. The computing system 120 can receive images of product captured by the image capturing device, an identifier associated with the product, and a weight of the product. The computing system 120 can execute the routing engine 420 in response to receiving the images, identifier and weight of the product. The routing engine 420 can extract a set of attributes associated with the product from the images. The routing engine 420 can use machine vision and/or video analytics to extract the set of attributes. The set of attributes can include color, size, dimensions, amount of use of the product and/or shape of the product. The routing engine 420 can query the products information database 430 using the identifier to retrieve information associated with the product. The information can be type of product, name of product, size, dimensions, weight and shape. The routing engine 420 can confirm the identity of the product by comparing the retrieved weight of the product and the received weight from the scale. The routing engine 420 can determine a location within the retail store to store the product based on the extracted set of attributes, the retrieved information and the received weight. The location can be a storage location.

The routing engine 420 can query the carts database 435 to determine which autonomously controlled cart 200 is scheduled to navigate to the determined location. Furthermore, the routing engine 420 can retrieve information about the autonomously controlled cart 200. The information can include size of the shopping cart and/or products already disposed in the shopping cart. The routing engine 200 can determine whether the product can fit in the autonomously controlled cart 200 based on the retrieved information. The routing engine 420 can transmit instructions to the autonomously controlled cart 200 to transport the product to the determined location in the retail store. The instructions can include information associated with the product, the detected weigh to the product and the coordinates of the location for transporting the product. The information associated with the product an include an identifier, name, size, dimensions and/or shape of the product. The autonomously controlled cart 200 can receive the instructions. The autonomously controlled cart 200 can determine weight and amount of products already disposed in the basket of the autonomously controlled cart. As mentioned above, a scale can be disposed in the basket of the autonomously controlled cart 200. The scale can detect the weight of the products disposed in the basket. The autonomously controlled cart 200 can determine whether the basket can receive the product included in the instructions. In response to determining the basket can receive the product included in the instructions, the autonomously controlled cart 200 can generate a light effect using a light source. The product can be deposited in the basket of the shopping cart. Alternatively, in response to determining the basket cannot receive the product, the autonomously controlled cart 200 can generate a different light effect using the light source.

The autonomously controlled cart 200 can detect the product has been deposited in the basket of the shopping cart in response to detecting the additional weight in the basket, via the scale. The autonomously controlled cart 200 can compare the additional weight to the weight of the product included in the instructions to confirm the autonomously controlled cart 200 received the same product as the product included in the instructions. The autonomously controlled cart 200 can also query the products database using the identifier to retrieve an stored weight of the product. In response to confirming the product received by the autonomously controlled cart 200 is the same product included in the instructions, the autonomously controlled cart 200 can determine whether the autonomously controlled cart 200 can receive further products. In response to determining the autonomously controlled cart 200 cannot receive further products, the autonomously controlled cart 200 can navigate through the retail store to the location included in the instructions. Once reaching the location the product can be unloaded from the basket of the autonomously controlled cart 200.

In some embodiments, the autonomously controlled cart 200 can include multiple products and the autonomously controlled cart 200 can receive multiple sets of instructions associated with each of the products. The sets of instructions can include multiple locations. The autonomously controlled cart 200 can navigate to each of the locations and wait at the locations until the respective product(s) are unloaded. The autonomously controlled cart 200 can determine a decrease in weight when the product is unloaded. The autonomously controlled cart 200 can all the respective products are unloaded at a specified location based on the detected decrease in weight. Once the basket of the autonomously controlled cart 200 is empty the autonomously controlled cart 200 can navigate back to the intake and deposit area.

Figure 5:
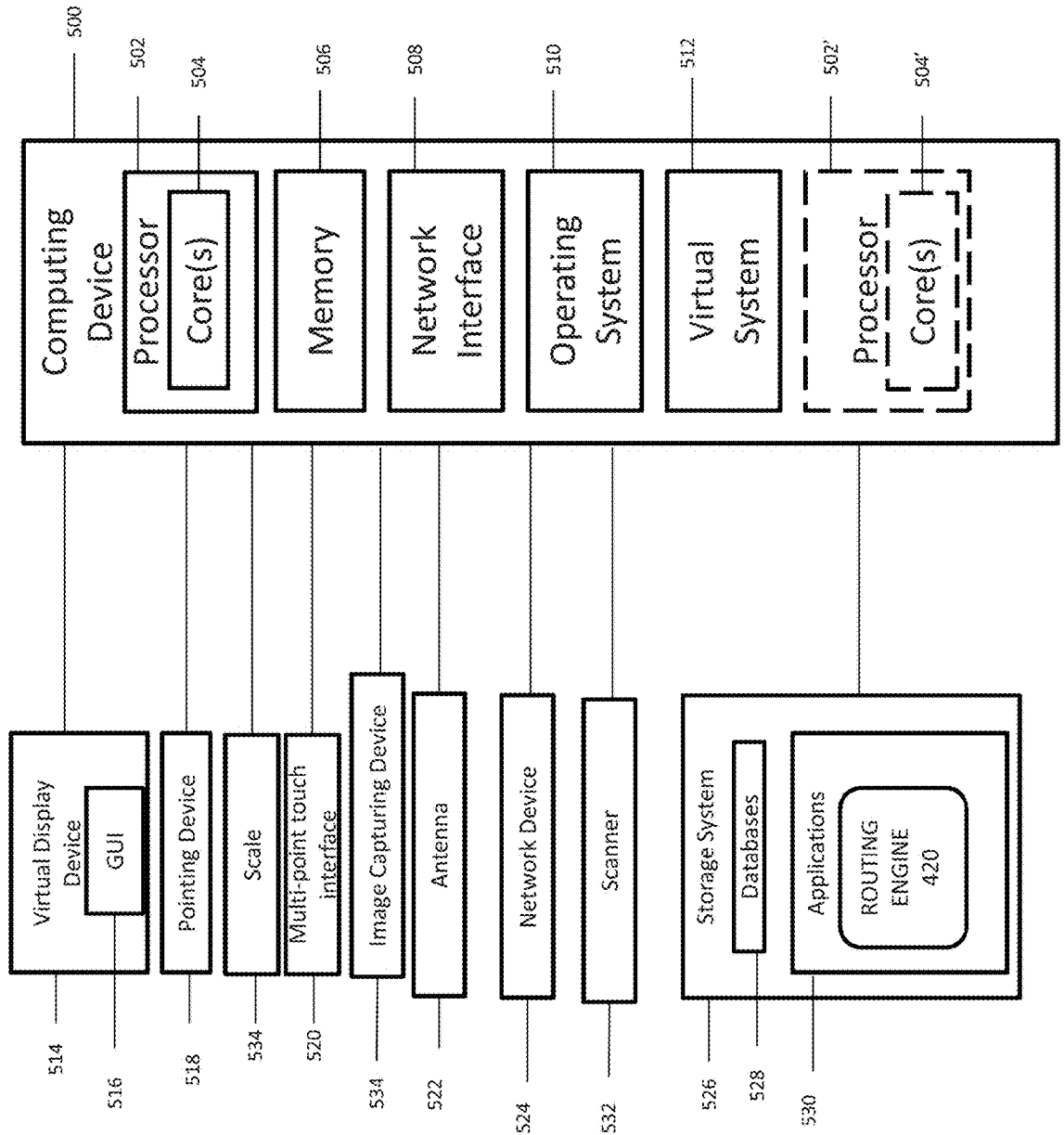
FIG. 5 illustrates an exemplary computing device in accordance with an exemplary embodiment.

FIG. 5 is a block diagram of an example computing device for implementing exemplary embodiments of the present disclosure. Embodiments of the computing device 500 can implement embodiments of the intake and transport system. The computing device 500 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 506 included in the computing device 500 may store computer-readable and computer-executable instructions or software (e.g., applications 530) for implementing exemplary operations of the computing device 500. The computing device 500 also includes configurable and/or programmable processor 502 and associated core(s) 504, and optionally, one or more additional configurable and/or programmable processor(s) 502' and associated core(s) 504' (for example, in the case of computer systems having multiple processors/cores), for executing computer-readable and computer-executable instructions or software stored in the memory 506 and other programs for implementing exemplary embodiments of the present disclosure. Processor 502 and processor(s) 502' may each be a single core processor or multiple core (504 and 504') processor. Either or both of processor 502 and processor(s) 502' may be configured to execute one or more of the instructions described in connection with computing device 500.

Virtualization may be employed in the computing device 500 so that infrastructure and resources in the computing device 500 may be shared dynamically. A virtual machine 512 may be provided to handle a process running on multiple processors so that the process appears to be using only one computing resource rather than multiple computing resources. Multiple virtual machines may also be used with one processor.

Memory 506 may include a computer system memory or random access memory, such as DRAM, SRAM, EDO RAM, and the like. Memory 406 may include other types of memory as well, or combinations thereof.

The computing device 500 can receive data from input/output devices such as, a reader 532, an image capturing device 534, and a scale 536. A user may interact with the computing device 500 through a visual display device 514, such as a computer monitor, which may display one or more graphical user interfaces 516, multi touch interface 520 and a pointing device 518.

The computing device 500 may also include one or more storage devices 526, such as a hard-drive, CD-ROM, or other computer readable media, for storing data and computer-readable instructions and/or software that implement exemplary embodiments of the present disclosure (e.g., applications). For example, exemplary storage device 526 can include one or more databases 328 for storing information regarding the physical objects. The databases 528 may be updated manually or automatically at any suitable time to add, delete, and/or update one or more data items in the databases. The databases 528 can include information such as information associated with physical objects and autonomously controlled carts.

The computing device 500 can include a network interface 508 configured to interface via one or more network devices 524 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 522 to facilitate wireless communication (e.g., via the network interface) between the computing device 500 and a network and/or between the computing device 500 and other computing devices. The network interface 508 may include a built-in network adapter, network interface card, PCMCIA network card, card bus network adapter, wireless network adapter, USB network adapter, modem or any other device suitable for interfacing the computing device 500 to any type of network capable of communication and performing the operations described herein.

The computing device 500 may run any operating system 510, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 500 and performing the operations described herein. In exemplary embodiments, the operating system 510 may be run in native mode or emulated mode. In an exemplary embodiment, the operating system 510 may be run on one or more cloud machine instances.

Figure 6:
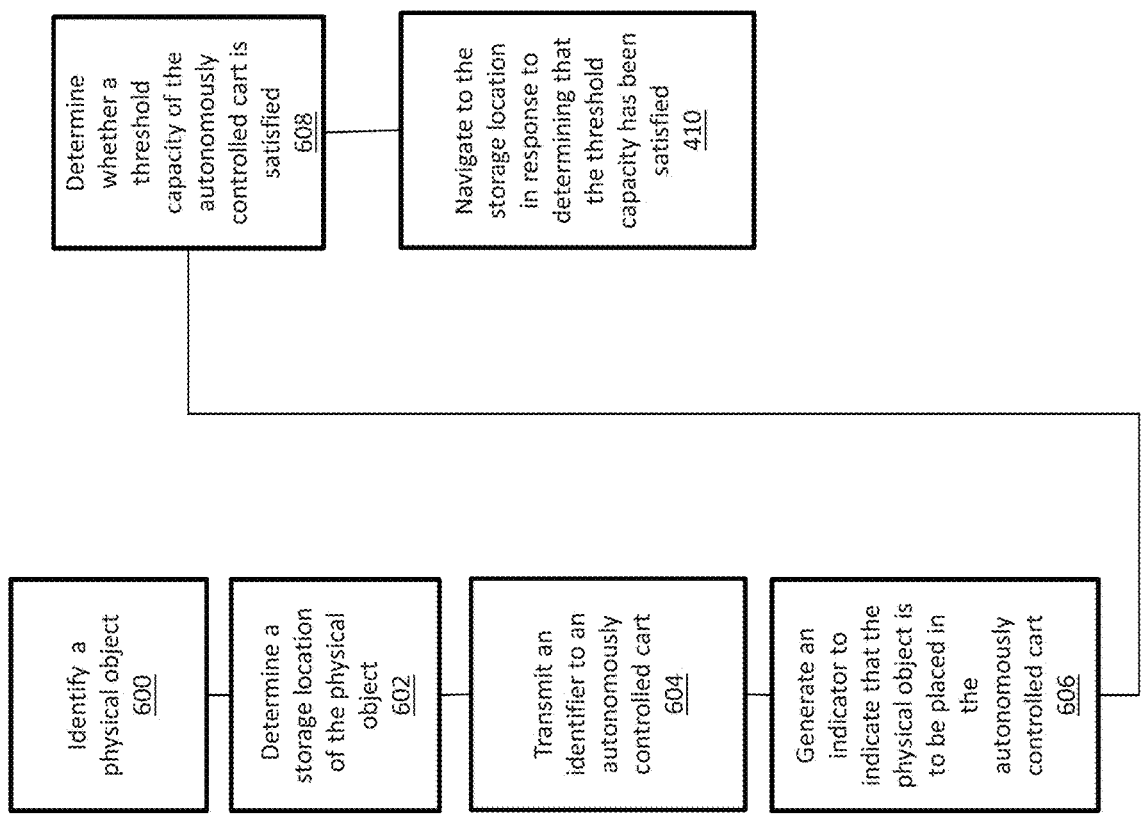
FIG. 6 is a flowchart illustrating a process of the intake and transport system according to an exemplary embodiment.

FIG. 6 is a flowchart illustrating a process of the intake and transport system according to an exemplary embodiment. In operation 600, a computing system (e.g. computing system 120 as shown in FIGS. 1, 3 and 4) can identify a physical object (e.g. physical object 300 as shown in FIG. 3) based on an attribute associated with the physical object. The computing system can be disposed in a deposit area (e.g. deposit area 100 as shown in FIGS. 1 and 3) in a facility. In operation 602, the computing system can determine a storage location (e.g. storage location 302 as shown in FIG. 3) of the physical object in the facility based on the attribute. In operation 604, in response identification of the physical object computing system can transmit an identifier to an autonomously controlled cart (e.g. autonomously controlled cart as shown in FIGS. 1-4). The autonomously controlled carts are disposed in the deposit area and being communicatively coupled to the computing system. The identifier corresponds to at least one of the attribute or the storage location. In operation 606, in response to receipt of the identifier activating an autonomously controlled cart can generate an indicator to indicate that the physical object is to be placed in the autonomously controlled cart. In operation 608, the autonomously controlled cart can determine whether a threshold capacity of the autonomously controlled cart is satisfied. In operation 610, the autonomously controlled cart can autonomously navigate to the storage location in response to determining that the threshold capacity has been satisfied.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A system to intake and transport physical objects in a facility, the system comprising:
   a computing system disposed in a deposit area of a facility, the computing system programmed to:
      identify a physical object disposed in the deposit area based on an attribute associated with the physical object; and
      determine a storage location of the physical object in the facility based on the attribute;
   a plurality of autonomously controlled carts, the plurality of autonomously controlled carts being disposed in the deposit area and being communicatively coupled to the computing system;
   wherein, in response to identification of the physical object by the computing system, the computing system is configured to transmit an identifier to the plurality of autonomously controlled carts in the deposit area, the identifier corresponding to at least one of the attribute or the storage location; and
   wherein, in response to receipt of the identifier, a first one of the plurality of autonomously controlled carts is configured to:
   determine whether the first one of the plurality of autonomously controlled carts has available capacity to receive the physical object;
   activate an indicator to indicate to the user of the computing system that the physical object is to be placed in the first one of the plurality of autonomously controlled carts in response to determining that the first one of the plurality of autonomously controlled carts has available capacity to receive the physical object;
   determine whether a threshold capacity of the first one of the plurality of autonomous carts is satisfied in response to receiving the physical object by the first one of the plurality of autonomous carts; and
   autonomously navigate to the storage location in response to determining that the threshold capacity has been satisfied.

2. The system of claim 1, wherein the first one of the plurality of autonomously controlled carts includes at least one of a light sensor, a weight sensor, or an image capturing device.

3. The system of claim 1, wherein the indicator is a light source coupled to the first one of the plurality of autonomously controlled carts, and the first one of the plurality of autonomously controlled carts is configured to energize the light source to activate the indicator.

4. The system of claim 1, wherein the first one of the plurality of autonomously controllers includes an inertial navigation system configured to detect and avoid obstacles as the first one of the autonomously controlled carts navigates to the storage location.

5. The system of claim 1, wherein the computing system is programmed to:
   identify an additional physical object based on an attribute associated with the additional physical object;
   determine another storage location for the additional physical object in the facility based on the attribute;
   transmit an additional identifier to the plurality of autonomously controlled carts, the additional identifier corresponding to at least one of the attribute of the additional physical object or the other storage location;
   wherein, in response to receipt of the identifier, a second one of the plurality of autonomously controlled carts is configured to:
   activate an indicator on the second one of the plurality of autonomously controlled carts to indicate to the user of the computing system that the additional physical object is to be placed in the second one of the plurality of autonomously controlled carts;
   determine whether a threshold capacity of the second one of the plurality of autonomous carts is satisfied; and
   autonomously navigate to the other storage location in response to determining that the threshold capacity has been satisfied.

6. The system of claim 1, wherein, in response to reaching the storage location, the first one of the plurality of autonomously controlled carts is configured to transmit a message to a mobile device to activate an alert on the mobile device notifying a user of the mobile device that the first one of the plurality of autonomously controlled carts has arrived at the storage location.

7. The system of claim 1, further comprising:
   a database;
   wherein the first one of the plurality of autonomously controlled carts is configured to interact with the database based on the attribute of the physical object.

8. The system of claim 7, wherein the first one of the autonomously controlled carts includes an electronic scale and is configured to:
   measure, via the electronic scale, a weight of the physical object received by the first one of the plurality of autonomously controlled carts;
   query the database based on the attribute to retrieve a stored weight of the first physical object; and
   compare the weight of the physical object measured by the electronic scale with the stored weight of the physical object to verify the physical object placed in the cart corresponds to the attribute.

9. The system of claim 1, wherein the first one of the plurality of autonomously controlled carts is configured to remain at the storage location until the physical object is removed from the first one of the autonomously controlled cart.

10. The system of claim 9, wherein, in response to the first one of the plurality of autonomously controlled carts being emptied, the first one of the autonomously controlled carts navigates back to the deposit area.

11. A method to intake and transport physical objects in a facility, the method comprising:
identifying, via a computing system disposed in a deposit area of a facility, a physical object disposed in the deposit area based on an attribute associated with the physical object;
determining, via the computing system, a storage location of the physical object in the facility based on the attribute;
in response to identification of the physical object transmitting, via the computing system an identifier to a plurality of autonomously controlled cart, each one of the plurality of autonomously controlled carts being disposed in the deposit area and being communicatively coupled to the computing system, the identifier corresponding to at least one of the attribute or the storage location;
determining by a first one of the plurality of autonomously controlled carts whether there is available capacity to receive the physical object;
in response to determining that the first one of the plurality of autonomously controlled carts has available capacity to receive the physical object activating, via the first one of the plurality of autonomously controlled carts, an indicator to indicate to the user of the computing system that the physical object is to be placed in the first one of the plurality of autonomously controlled carts;
in response to receiving the physical object by the first one of the plurality of autonomous carts, determining, via the first one of the plurality of autonomously controlled carts, whether a threshold capacity of the first one of the plurality of autonomous carts is satisfied; and
autonomously navigating, via the first one of the plurality of autonomously controlled carts, to the storage location in response to determining that the threshold capacity has been satisfied.

12. The method of claim 11, wherein energizing, via the first one of the plurality of autonomously controlled carts, energize a light source coupled to the first one of the plurality of autonomously controlled carts to activate the indicator, wherein the indicator is the light source.

13. The method of claim 11, further comprising detecting and avoiding, via an inertial navigation system included in the first one of the plurality of autonomously controlled carts, obstacles as the first one of the autonomously controlled carts navigates to the storage location.

14. The method of claim 11, further comprising:
identifying, via the computing system, an additional physical object based on an attribute associated with the additional physical object;
determining, via the computing system, another storage location for the additional physical object in the facility based on the attribute;
transmitting, via the computing system, an additional identifier to the plurality of autonomously controlled carts, the additional identifier corresponding to at least one of the attribute of the additional physical object or the other storage location;
in response to receipt of the identifier activating via a second one of the plurality of autonomously controlled carts, an indicator on the second one of the plurality of autonomously controlled carts to indicate to the user of the computing system that the additional physical object is to be placed in the second one of the plurality of autonomously controlled carts;
determining, via the second one of the plurality of autonomously controlled carts, whether a threshold capacity of the second one of the plurality of autonomous carts is satisfied; and
autonomously navigating, via the second one of the plurality of autonomously controlled carts, to the other storage location in response to determining that the threshold capacity has been satisfied.

15. The method of claim 11, further comprising in response to reaching the storage location, transmitting, via the first one of the plurality of autonomously controlled carts, a message to a mobile device to activate an alert on the mobile device notifying a user of the mobile device that the first one of the plurality of autonomously controlled carts has arrived at the storage location.

16. The method of claim 11, wherein the first one of the plurality of autonomously controlled carts includes at least one of a light sensor, a weight sensor, or an image capturing device.

17. The method of claim 16, further comprising:
interacting, via the first one of the plurality of autonomously controlled carts, with a database based on the attribute of the physical object.

18. The method of claim 17, further comprising:
measuring, via an electronic scale included on the first one of the autonomously controlled carts, a weight of the physical object received by the first one of the plurality of autonomously controlled carts;
querying, the first one of the autonomously controlled carts, the database based on the attribute to retrieve a stored weight of the first physical object; and
comparing, the first one of the autonomously controlled carts, the weight of the physical object measured by the electronic scale with the stored weight of the physical object to verify the physical object placed in the cart corresponds to the attribute.

19. The method of claim 11, further comprising remaining, via the first one of the plurality of autonomously controlled carts, at the storage location until the physical object is removed from the first one of the autonomously controlled cart.

20. The method of claim 19, further comprising in response to the first one of the plurality of autonomously controlled carts being emptied, navigating, via the first one of the autonomously controlled carts, back to the deposit area.

* * * * *